(No Model.)  2 Sheets—Sheet 1.

W. C. MOORE.
WHEEL CULTIVATOR.

No. 510,923. Patented Dec. 19, 1893.

Witnesses:
John T. Wood
Dallie Green

Inventor:
Waverly C. Moore (No Model.)
W. C. MOORE.
WHEEL CULTIVATOR.
No. 510,923.                                         Patented Dec. 19, 1893.
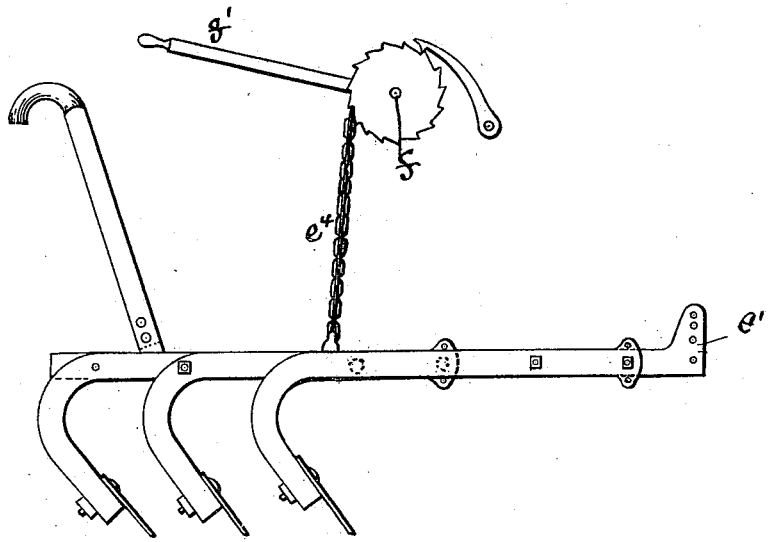
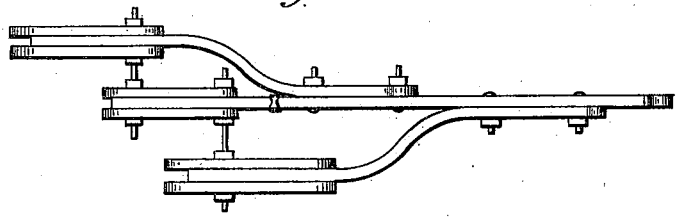
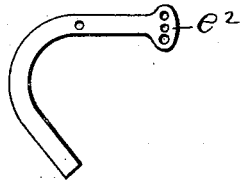  
Witnesses:
John J. Wood
Dollie Green
Inventor:
Waverly C. Moore

UNITED STATES PATENT OFFICE.

WAVERLY C. MOORE, OF GREER'S DEPOT, SOUTH CAROLINA.

WHEEL-CULTIVATOR.

SPECIFICATION forming part of Letters Patent No. 510,923, dated December 19, 1893.

Application filed December 13, 1892. Serial No. 455,093. (No model.)

*To all whom it may concern:*

Be it known that I, WAVERLY C. MOORE, of Greer's Depot, in the county of Greenville, in the State of South Carolina, have invented certain new and Improved Features to be Used in the Construction of Wheel-Cultivators; and I do hereby declare that the following is a full and exact description of my invention, reference being had to the accompanying drawings, and the letters of reference marked thereon.

Figure 1:
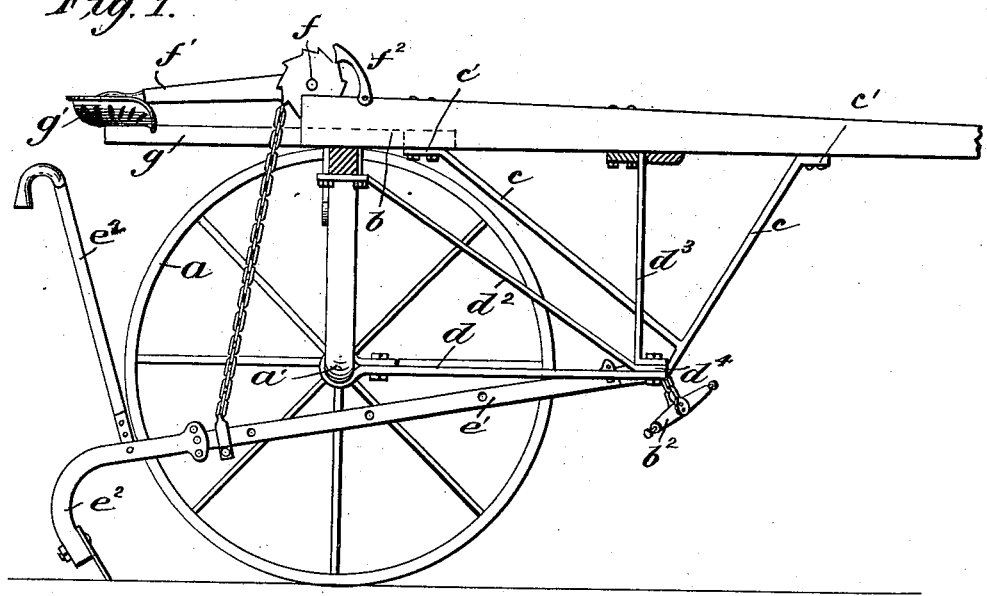
Figure 2:
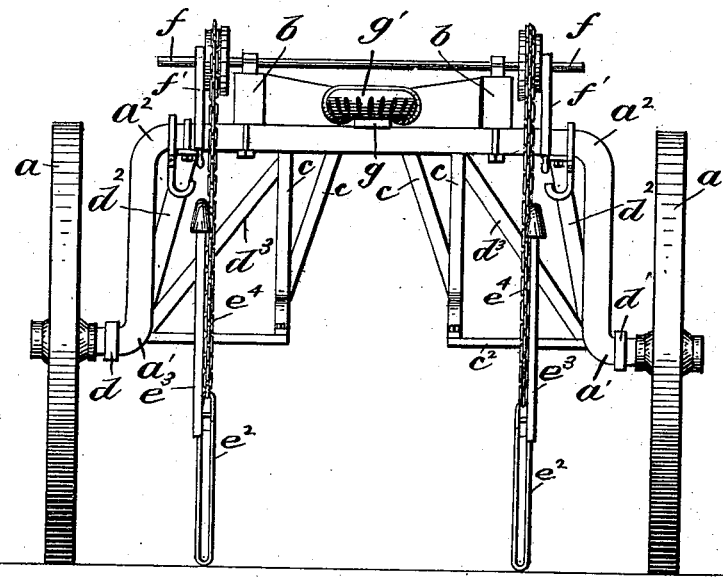

Figure 1 represents a side elevation of the left half section of my cultivator; the right half being a duplicate of same. Fig. 2 represents a rear view of my invention. Figs. 3, 4, 5, 6, and 7, represent detached parts of the feet or standards and beams.

In Fig. 2, $a$, represents suitable wheels that turn on axle at point bent upward at $a'$, and horizontal at $a^2$, in the form of a long central crank arm.

$b$, represents the rear end of a bi-section tongue or guide pole which is secured to the axle $a^2$, $a^2$, by clip bolts on which is mounted a horizontal rod $f$, on which revolves a movable ratchet drum and lever $f'$, over which is wound a chain $e^4$, which is attached to the beam at its rear end $e'$, by which the operator can raise or lower the feet or standards at will, the ratchet $f$ being held in any desired position by the catch $f^2$.

$g$, represents a beam fastened at its front end to the frame. The rear end supports a seat $g'$.

$c$, $c$, represent a V-shaped standard fastened to the section of pole by bolts at $c'$, $c'$, the lower end of which is elongated, bent backward, and fastened to the inner end of a horizontal bar $c^2$, which is punctured along its length by holes. The outer end of said bar $c^2$, is supported by brace rods $d$, extending from the axle $a'$; $d^2$, from the axle at $a^2$, and $d^3$, from the section of pole just over the bar all uniting at $d^4$, Fig. 1, with the outer end of said bar $c^2$, forming a rigid brace.

The beam $e'$, is fastened at its forward end to the horizontal bar $c^2$, by a double clevis to which is also attached the singletree which allows the beam $e'$, an easy motion either upward or sidewise. To the side of said beam $e'$, can be attached S-shaped beams Fig. 7, to the rear of which can be attached standards Figs. 5 and 6, as shown in Fig. 4. The end of the beam $e'$, is turned up at the rear end to which is attached a handle $e^2$.

The central beam $e'$, is provided at its forward end with a series of holes to provide for the regulation of the pitch in conjunction with those in the forward end of the feet $e^2$, Fig. 6, by which the operator can set the pitch of the feet to the soil and by adjusting the tension of the chain $e^4$, properly, the depth of furrow made will be uniform.

Having described my invention, what I claim as new, and desire to secure by Letters Patent, is—

1. A cultivator frame, composed of the arched axle $a^2$, the tongue $b$, the branched standards or hangers $c$, $c$, the horizontal bars $c^2$, and braces $d$, $d^2$, $d^3$, substantially as shown and described and for the purposes set forth.

2. The combination of the frame as described with the shovel beams or gangs $e'$, the adjustable standards $e^2$, the shaft $f$, the ratchet drum and levers $f'$, $f^2$, and the chain $e^4$, substantially as shown and described and for the purposes set forth.

WAVERLY C. MOORE.

Witnesses:
DOLLIE GREENE,
JOHN F. WOOD.